(12) United States Patent
Claypole et al.

(10) Patent No.: US 8,679,659 B2
(45) Date of Patent: Mar. 25, 2014

(54) TEMPERATURE CONTROL OF A VEHICLE BATTERY

(75) Inventors: George M. Claypole, Fenton, MI (US); Keith R. Kabel, Shelby Township, MI (US); Gregory A. Major, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 789 days.

(21) Appl. No.: 12/603,141

(22) Filed: Oct. 21, 2009

(65) Prior Publication Data

US 2011/0091750 A1  Apr. 21, 2011

(51) Int. Cl.
*H01M 10/44* (2006.01)
*H01M 10/50* (2006.01)

(52) U.S. Cl.
USPC .................................. 429/50; 429/62

(58) Field of Classification Search
None
See application file for complete search history.

(56) References Cited

U.S. PATENT DOCUMENTS

| | | | | |
|---|---|---|---|---|
| 3,455,743 | A * | 7/1969 | Huebscher et al. | 429/413 |
| 6,394,210 | B2 * | 5/2002 | Matsuda et al. | 180/68.1 |
| 6,481,230 | B2 * | 11/2002 | Kimishima et al. | 62/239 |
| 2008/0075993 | A1 * | 3/2008 | Druenert et al. | 429/26 |
| 2008/0180238 | A1 * | 7/2008 | Plummer et al. | 340/468 |

* cited by examiner

*Primary Examiner* — Ula C Ruddock
*Assistant Examiner* — Daniel Gatewood

(57) ABSTRACT

The method for thermal management of a battery can include vehicle systems to control the thermal input to the battery and a dedicated battery thermal management system. The battery thermal management system includes transferring battery heat to coolant flowing in a circuit, if ambient air temperature is greater than the battery temperature, using an evaporator/chiller to transfer heat from the coolant to a refrigerant, using a condenser to transfer heat from the refrigerant to the coolant, and using a radiator to transfer heat from the coolant to ambient air; and if coolant can be maintained in the reference temperature range without using a heat source or refrigerant, using a radiator to transfer heat from the coolant to the ambient air.

6 Claims, 3 Drawing Sheets

TEMPERATURE CONTROL OF A VEHICLE BATTERY

BACKGROUND OF INVENTION

The present invention relates generally to a dedicated temperature management system for an electric storage battery particularly one for of an electric vehicle.

A hybrid electric vehicle combines a conventional usually fossil fuel-powered engine with some form of electric propulsion. The battery electric vehicle (BEV) is a type of electric vehicle that uses chemical energy stored in rechargeable battery packs. As with other electric vehicles, BEVs use electric motors and motor controllers, instead of internal combustions engines, for propulsion.

Battery electric cars are becoming more attractive due to higher oil prices and the advancement of new battery technologies that provide higher power, energy density, improved acceleration and greater range with fewer cells.

Batteries are among the most expensive component of BEVs. Rechargeable batteries used in electric vehicles include lead-acid, NiCd, nickel metal hydride, lithium ion, and Li-ion polymer. Optimum performance of advanced high energy density batteries requires that the battery temperature be maintained in an optimal range, whether the vehicle is operating, charging or standing idle, and regardless of the thermal loads caused by ambient conditions such as air temperature.

An analysis of vehicle battery thermal loads indicates that the battery thermal management system capacity requirements is strongly influenced by the ambient soak conditions the vehicle must accommodate rather than the actual battery charge and discharge operational losses.

Battery insulation for cold and hot conditions, cabin solar shading and cabin solar powered ventilation reduce substantially the active heating load and cooling load. A dedicated battery active/passive thermal system can be used to control the ambient thermal loads of the battery. I Isolation of the battery pack by thermal insulation, and reduce the in-cabin soak temperatures during high solar, high temperature conditions can reduce the thermal loads on the battery thermal system and significantly reduce the system size, cost and reduce the energy require to thermally mange the battery.

A system that controls temperature of advanced high energy batteries would use the cabin air conditioning system for active cooling, a separate coolant circuit for passive cooling, and an electric heater for battery heating.

SUMMARY OF INVENTION

A method for controlling the temperature of a vehicle battery includes transferring battery heat to coolant flowing in a circuit, if ambient air temperature is greater than the battery temperature, using an evaporator/chiller to transfer heat from the coolant to a refrigerant, using a condenser to transfer heat from the refrigerant to the coolant, and using a radiator to transfer heat from the coolant to ambient air; and if coolant can be maintained in the reference temperature range without using a heat source or refrigerant, using a radiator to transfer heat from the coolant to the ambient air.

The invention contemplates a system that includes a circuit in which battery heat is transferred to coolant in the circuit, a pump for circulating coolant in the circuit, an evaporator/chiller for transferring coolant heat to a refrigerant, a condenser for transferring heat from the refrigerant to the coolant, and a radiator for transferring heat from the coolant to ambient air.

The thermal system, dedicated to controlling temperature of an electric storage battery, accommodates specific battery chemistry and its duty cycle, and is adaptable to liquid, air and refrigerant heat transfer media.

The system allows optimization of vehicle thermal and climate systems without having to compromise performance and efficiency due to the different and sometimes conflicting thermal demands of a battery.

The refrigeration portion is designed and fabricated in one-piece with no fittings or a minimum number of fittings, thereby eliminating most causes of system downtime, such as refrigerant leaks and providing the reliability and durability required for life-of-the vehicle battery life and full performance, with a minimum consumption of energy and little or no maintenance.

The system is intended to be located within a battery pack for simplification and efficiency but can be located elsewhere to accommodate other packaging requirements. Its location within the battery pack reduces plumbing and control interfaces.

The system has outstanding efficiency since all of the active components can be designed and operated within their optimum design points.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
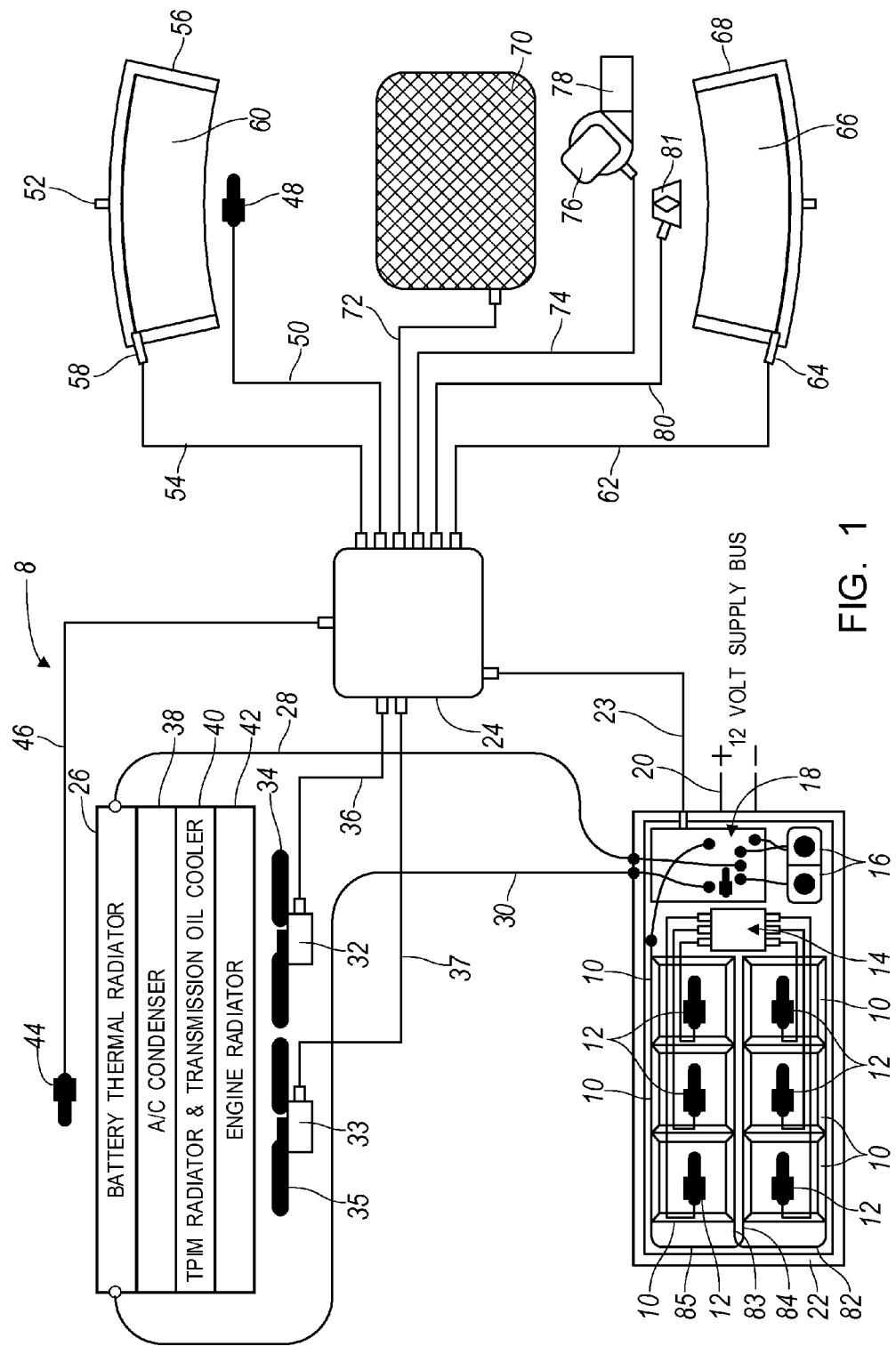
FIG. 1 is schematic diagram of a battery temperature control system, for which the coolant is a liquid.

Referring now to the drawings, the battery temperature system 8, illustrated in Figure, 1 includes multiple battery packs 10, each containing battery cells, temperature sensors 12 connected to a battery controller 14, coolant reservoirs 16, a battery thermal system 18, a 12 volt supply bus 20, and a 10 to 20 mm thickness of insulation 22, preferably Cryogel insulation, enclosing the battery packs 10. The battery thermal system 18 communicates through line 23 with a microprocessor-based controller 24, which controls activation and deactivation of various components. Controller 24 produces control signals as determined by repetitive execution of a control algorithm stored in electronic memory accessible to the controller.

A battery thermal radiator 26 is supplied with hot coolant exiting the packs 10 through hydraulic passage 28 and returns low temperature coolant through hydraulic passage 30 to the battery packs 10 after transferring heat from the coolant to ambient air. Electric current supplied to motors 32, 33 is controlled by controller 24 and carried through electric lines 36, 37, respectively, to drive fans 34, 35. Fans 34, 35 facilitate heat transfer to the air by forcing ambient air at high speed through the battery radiator 26, air conditioning system condenser 38, TPIM radiator and transmission oil cooler 40, and engine coolant radiator 42, which are preferably arranged in series.

A sensor 44, connected by line 46 to controller 24, produces an electronic signal representing temperature of the ambient air upstream from the fans 34, 35.

A sensor 48, connected by line 50 to controller 24, produces a signal representing temperature of the ambient in the vehicle's cabin, i.e., passenger compartment.

A solar sensor 52, connected by line 54 to controller 24, produces an electronic signal representing solar energy 56, and line 54 supplies electric power to an actuator 58, which opens and closes a windshield shade 60 under control of controller 24.

Similarly, line 62 supplies electric power to an actuator 64, which opens and closes a shade 66 that covers the backlight 68 at the rear of the cabin under control of controller 24.

A solar panel 70, comprising an array of photovoltaic cells, produces electric current, which is carried on line 72 to controller 24. Line 74 carries electric current from battery packs 10 through controller 24 to a cabin blower air exhauster 76, such as a fan, which forces air through a duct 78 from the vehicle cabin to the ambient atmosphere.

Controller 24 receives information regarding the vehicle's location and the season of the year on a line 80, which carries an appropriate signal through a receiver 81 or similar device from a wireless communication system, such On Star, through which the vehicle occupants communicate external to the vehicle.

In operation, coolant, in the form of a 50/50 mixture of deionized water and ethylene glycol, flows from passage 30 through reservoirs 16 and through passages 82, 83 along the battery packs 10. Heat from the battery packs 10 is transferred to coolant in passages 82, 83. Return passages 84, 85 carry hot coolant from the battery packs 10 to radiator 26 through passage 28.

Figure 2:
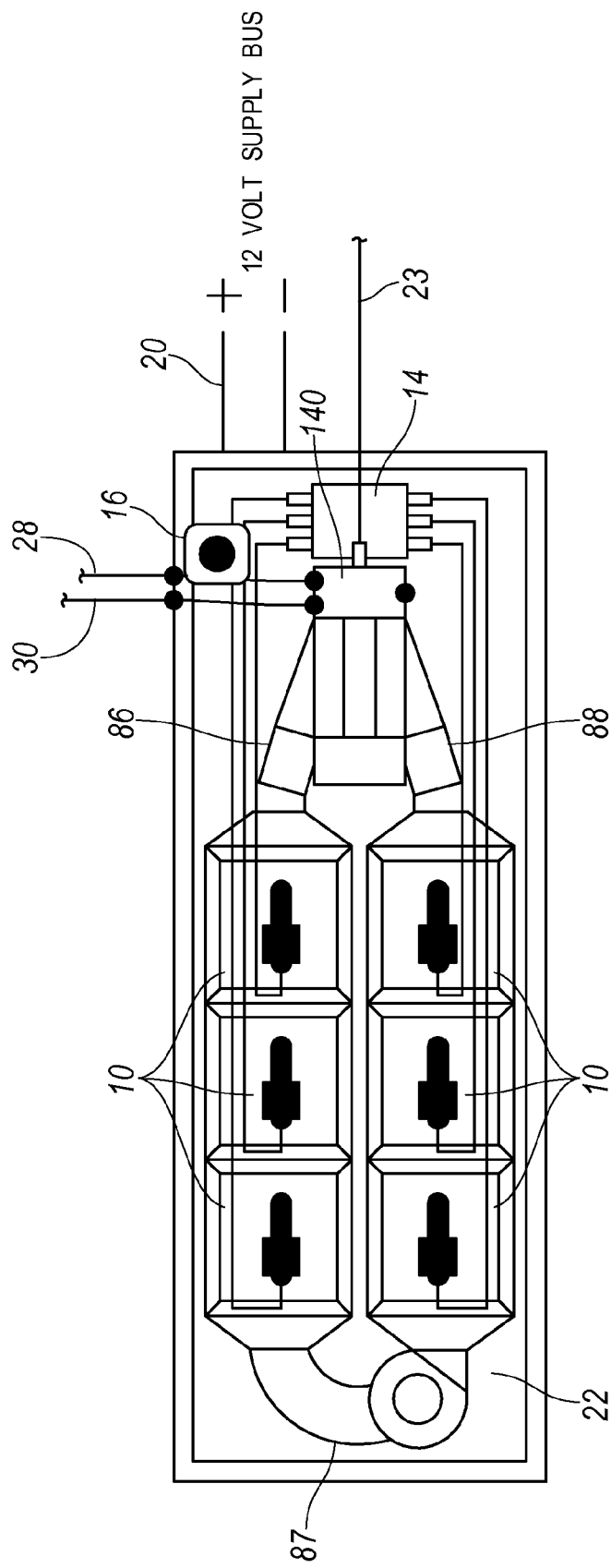
FIG. 2 is illustrates the battery packs of a battery temperature control system, for which the coolant is chilled air.

FIG. 2 illustrates the battery packs 10 of the battery temperature control system 8, for which the coolant is chilled air, which flows from the heat exchanger 140 through ducts 86, 87, 88 and along the battery packs 10. Heat from the battery packs 10 is transferred to the coolant in ducts. Heated air is carried through line 28 to radiator 26, where a heat exchange occurs with ambient air. The battery packs 10 of FIG. 2 are connected to controller 24 as illustrated in FIG. 1. The sensors 44, 48, 52, actuator 58, 64, solar panel 70 and other equipment system 8 are interconnected as described with reference to FIG. 1.

Figure 3:
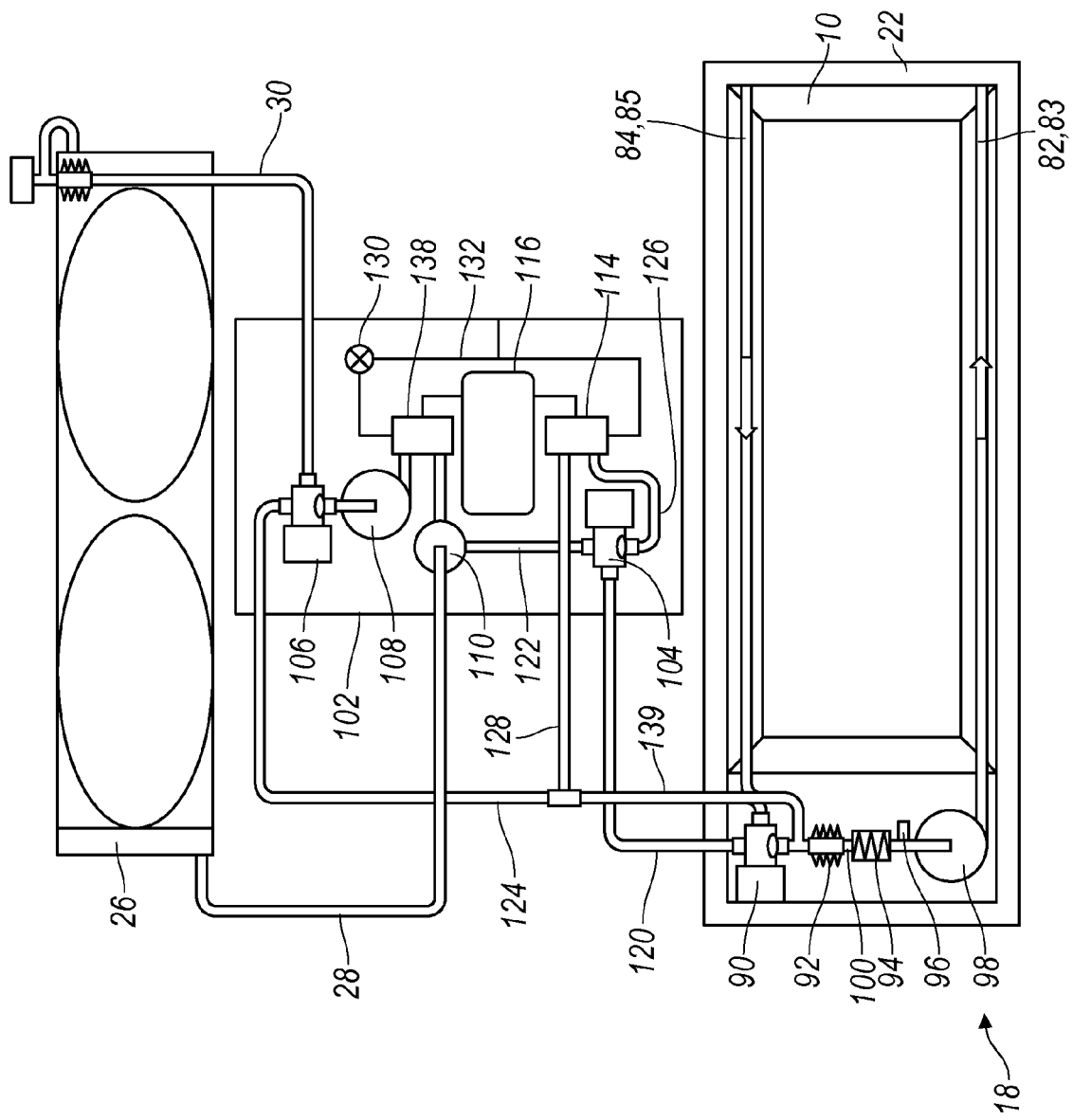
FIG. 3 is a schematic diagram showing details of the battery temperature control system of FIG. 1.

The battery thermal system 18, shown in greater detail in FIG. 3, includes an electronically actuated three-way control valve 90, expansion bellows 92 for maintaining constant coolant pressure in lines 82-85, heater 94, coolant temperature sensor 96, and coolant pump 98. A coolant passage 100 connects an output of control valve 90 to coolant pump 98

A self-contained subassembly 102, which can be installed at any appropriate location in the vehicle, includes two, three-way control valves 104, 106, coolant pump 108, air separator extractor 110, refrigerant condenser 138, refrigerant evaporator/chiller 114, refrigerant compressor 116, coolant passages connecting these components to battery thermal system 18 and battery radiator 26, and refrigerant passages.

Each of the three-way controls valves 90, 104, 106 operates in exclusive-OR logic, i.e., its input is connected to one of its outputs but not to both outputs, in response to a control signal sent to the valve from controller 24.

The battery temperature system 8 operates in a first mode when the temperature of ambient air is substantially less than the temperature of the battery packs 10, such as when the ambient air is cold. During first mode operation, control valves 104, 106 are closed, and valve 90 has an open connection between passages 84, 85 and passage 100. Coolant pump 98 pumps coolant through passages 82-85. Valve 90 connects return passages 84, 85 to passage 100. Heater 94 increases the temperature of the coolant circulating through the battery packs 10 to a reference temperature. The on and off states of heater 94 are changed by controller 24 in response to temperature of coolant circulating through the battery packs 10, monitored by sensor 96 and reported to the controller.

The battery temperature system 8 operates in a second mode when the temperature of ambient air is less than the temperature of the battery packs 10, such as when the ambient air has a moderate temperate. During second mode operation, control valve 90 has an open connection between coolant return passages 84, 85 and passage 120, control valve 104 has an open connection between passage 120 and passage 122, and control valve 106 has an open connection between passage 30 and passages 124, 139. Coolant pump 98 pumps coolant through passages 82-85. Valve 90 connects return passages 84, 85 to the air separator extractor 110 through passage 120, control valve 104 and passage 122. Coolant exits air extractor through passage 28, flows through the battery radiator 26 wherein it transfers heat to the ambient air, and returns to passage 100 of battery temperature system 8 through control valve 106 and passage 124. Heater 94 increases the temperature of the coolant circulating through the battery packs 10 to a reference temperature. The on and off states of heater 94 are changed by controller 24 in response to temperature of coolant circulating through the battery packs 10, monitored by sensor 96 and reported to the controller.

The battery temperature system 8 operates in a third mode when the temperature of ambient air is substantially greater than the temperature of the battery packs 10, such as when the ambient air is hot. During third mode operation, control valve 90 has an open connection between coolant return passages 84, 85 and passage 120, control valve 104 has an open connection between passage 120 and passage 126, and control valve 106 has an open connection between return passage 30 and coolant pump 108. Coolant pump 98 pumps coolant through passages 82-85. Valve 90 connects return passages 84, 85 to control valve 104, which directs coolant to evaporator/chiller 114 through passage 126. In evaporator/chiller 114, heat is exchanged from the coolant to refrigerant circulating in a refrigerant system. Coolant exits evaporator/chiller 114 and returns to passage 100 of battery temperature system 8 through passages 128, 139.

The refrigerant is preferably 134A or 1234YF, such as is used for vehicle cabin air conditioning. Refrigerant exiting evaporator/chiller 114 as a low temperature vapor is compressed to a high temperature and high pressure vapor in compressor 116. Heat from the refrigerant is exchanged to air in the tubes of condenser 38 and exists as a low temperature, high pressure liquid. Refrigerant in that state expands through expansion valve 130 and returns through refrigerant line 132 to the plates of evaporator/chiller 114.

The system 8 maintains battery pack temperatures within specified limits for specified periods of time for the life of the vehicle. The system is not dependent on vehicle climate and thermal systems that would be forced to operate below maximum efficiency.

While certain embodiments of the present invention have been described in detail, those familiar with the art to which this invention relates will recognize various alternative designs and embodiments for practicing the invention as defined by the following claims.

What is claimed is:

1. A method for controlling a battery temperature of a vehicle battery pack, comprising the steps of:
   (a) flowing a coolant through coolant passages within the battery pack and into a first 3-way valve;
   (b) while an ambient air temperature is lower than said battery temperature, actuating the first 3-way valve to direct the coolant from the first 3-way valve through a heat source and back into the coolant passages within the battery pack, and activating the heat source to maintain the coolant at a reference temperature;
   (c) while the ambient air temperature is greater than said battery temperature, actuating the first 3-way valve to direct the coolant to a second 3-way valve in a self-contained refrigeration system and actuating the second 3-way valve to direct the coolant through an evaporator as the self-contained refrigerant system is activated to remove heat from the coolant and directing the coolant from the evaporator back into the coolant passages within the battery pack; and
   (d) while the ambient air temperature is between the temperature of steps (a) and (b), actuating the first 3-way valve to direct the coolant to the second 3-way valve and actuating the second 3-way valve to direct the coolant to bypass the evaporator and direct the refrigerant to a battery radiator to transfer heat from the coolant into air flowing through the battery radiator, and direct the coolant from the battery radiator to a third 3-way valve in the self-contained refrigeration system, and actuating the third 3-way valve to direct the coolant back into the coolant passages within the battery pack.

2. The method of claim 1 wherein the coolant is a mixture of water and ethylene glycol.

3. The method of claim 1 wherein step (b) further comprises:
   using a pump, mounted inside of an insulation surrounding the battery pack, to circulate the coolant in the battery pack.

4. The method of claim 1 wherein step (b) further comprises:
   using a pump, mounted within a battery pack assembly that is surrounded by a layer of insulation and includes the battery pack, to circulate the coolant in the battery pack and through the heater;
   using a sensor, mounted within the battery pack assembly, to determine the coolant temperature in the battery pack; and
   supplying electric power to the heat source, mounted within the battery pack assembly, to heat the coolant when the coolant temperature is below the reference temperature.

5. The method of claim 1 wherein step (c) further comprises locating the self-contained refrigerant system, including a refrigerant compressor, within a battery pack assembly that is surrounded by a layer of insulation and includes the battery pack.

6. The method of claim 5 wherein step (c) further comprises providing a refrigerant condenser in the self-contained refrigerant system located within the battery pack assembly.

* * * * *